No. 868,115. PATENTED OCT. 15, 1907.
J. C. OLIVA.
SIDE STEP FOR WAGONS.
APPLICATION FILED DEC. 3, 1906.

Witnesses.
P. C. Dahlberg.
J. B. Smutney.

Inventor.
John C. Oliva.
by Oursy & Lane atty's.

UNITED STATES PATENT OFFICE.

JOHN C. OLIVA, OF MARENGO, IOWA.

SIDE STEP FOR WAGONS.

No. 868,115.  Specification of Letters Patent.  Patented Oct. 15, 1907.

Application filed December 3, 1906. Serial No. 346,053.

*To all whom it may concern:*

Be it known that I, JOHN C. OLIVA, a citizen of the United States, residing at Marengo, in the county of Iowa and State of Iowa, have invented a certain new and useful Side Step for Wagons, of which the following is a specification.

The object of my invention is to provide a side step for wagons of simple, durable and inexpensive construction that may be used in the nature of an attachment to be readily, easily and quickly detached to or from a wagon without the use of screws, bolts or similar fastening devices and when in use will provide a step firmly and immovably supported below the center of the box.

My invention consists in the construction of the side step attachment and in the arrangement and combination thereof with a wagon, whereby the objects contemplated are attained, as hereinafter more fully set forth, pointed out in my claims and illustrated in the accompanying drawings, in which—

Figure 1:
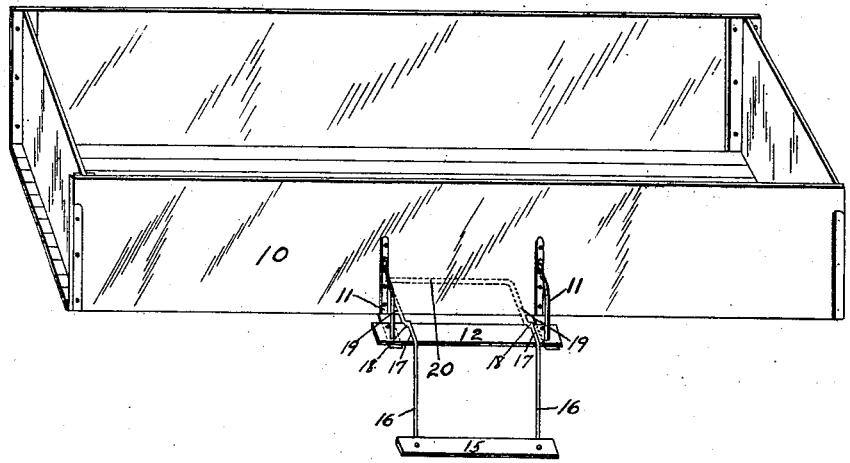
Figure 3:
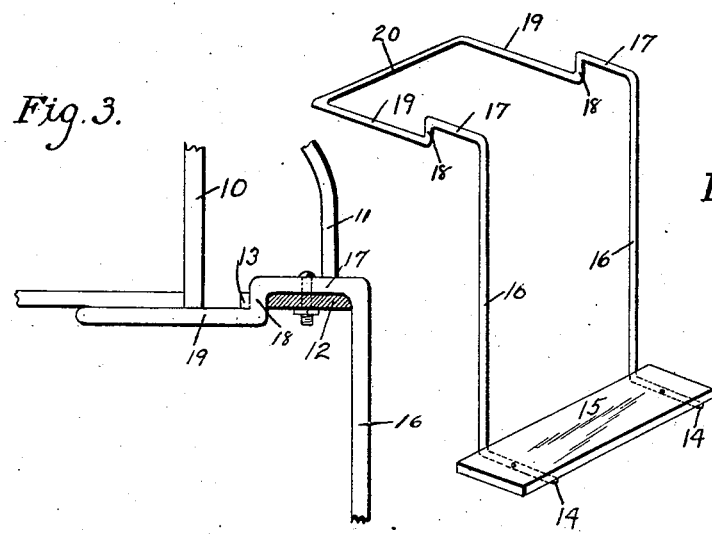
Figure 2:
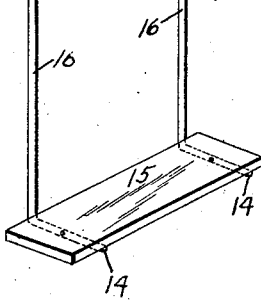

Figure 1 shows a perspective view of a wagon having my improved side step attached thereto. Fig. 2 shows a perspective view of the side step attachment embodying my invention, and Fig. 3 shows a detail view of one corner of a wagon box and a cleat adjacent to the wagon and my improved side step resting on the cleat and projecting under the wagon box.

Referring to the accompanying drawings, I have used the reference numeral 10 to indicate the body of the wagon box. On the side of the wagon box near its central portion are two brackets 11 which support a cleat 12. This is usually made of wood and extends parallel with the wagon box and spaced apart from it. This cleat is adapted for use in connection with my improved side step by forming notches 13 in its inner edge near its ends.

My improved side step comprises a frame made of a single piece of metal. The end portions of this piece of metal are indicated by the numeral 14 and are arranged horizontally parallel with each other and extended transversely of the wagon box. A wooden step 15 is fixed thereto. At the inner ends of the parts 14 are the uprights 16. At the top of said uprights are the horizontal inwardly projecting portions 17 shaped to lie flat on top of the cleat 12. At the inner ends of the parts 17 are the downwardly projecting portions 18 to enter the notches 13 of the cleat 12 and to engage the inner edge of said cleat. At the ends of the parts 18 the frame extends inwardly and horizontally at 19 and the inner ends of the parts 19 are connected by the cross piece 20. The parts 19 and 20 are designed to project under the wagon box as shown in Fig. 3.

In practical use, it is obvious that the attachment may be made quickly and easily of inexpensive material. The frame is preferably of a round iron bar, but may, of course, be made of any kind of metal of suitable strength.

If it is desired to connect the side step with the vehicle, the parts 19 and 20 are first introduced between the side of the wagon box and the cleat 12 until the parts 17 engage the top of the cleat 12, then the lower ends of the frame are moved downwardly and inwardly until the parts 19 and 20 rest against the under surface of the wagon box. The parts 18 of the frame will rest in the notches 13 of the cleat and in this way longitudinal movement of the side step is prevented. The notches 13 in the cleat may be dispensed with if the attachment fits closely between the brackets 11 which will then serve to prevent longitudinal movement, or the said notches may be dispensed with even if the frame does not fit between the brackets because the slight longitudinal movement would not be a material objection.

Having thus described my invention, what I claim and desire to secure by Letters Patent of the United States, therefor is—

1. A side step for wagons, comprising a frame having its upper portion shaped to fit over and rest upon a cleat on the wagon box, and having shoulders projecting downwardly to engage the inner edge of said cleat to prevent the frame from slipping outwardly, and also having a portion to project under the wagon box, and a step portion fixed to the lower end of the frame.

2. The combination with a wagon box having brackets at its sides and a cleat secured to the said brackets to extend longitudinally of the wagon box, spaced apart therefrom, and having notches on its inner edge, and a frame having its upper portion shaped to fit over the cleat and having a downwardly projecting portion to enter the notches, and a part to project under the wagon box, the lower portion of said frame extended downwardly and outwardly, and a side step fixed thereto.

Des Moines, Iowa, Nov. 1, 1906.

JOHN C. OLIVA.

Witnesses:
M. F. COX,
C. I. DENZLER.